United States Patent [19]

Fujiwara et al.

[11] Patent Number: 5,160,877
[45] Date of Patent: Nov. 3, 1992

[54] MULTIPLE DEGREE-OF-FREEDOM POSITIONING DEVICE

[75] Inventors: Shigeki Fujiwara, Izumiootsu; Ryosuke Maruyama, Hirakata, both of Japan

[73] Assignee: Matsushita Electric Works, Ltd., Osaka, Japan

[21] Appl. No.: 669,570

[22] Filed: Mar. 14, 1991

[30] Foreign Application Priority Data

Mar. 15, 1990 [JP] Japan .................. 2-65013

[51] Int. Cl.$^5$ ........................................... G05D 11/08
[52] U.S. Cl. ...................... 318/568.21; 318/646; 318/687; 318/640; 901/29; 901/30; 310/90.5; 395/93
[58] Field of Search ................ 318/560–574, 318/640, 687, 646; 395/80–99; 901/3, 5, 9, 12, 13, 15, 18, 19, 23, 21, 29, 30, 45–47; 310/166, 90.5, 112, 191, 12, 14; 219/116, 108

[56] References Cited

U.S. PATENT DOCUMENTS

| | | | |
|---|---|---|---|
| 4,320,392 | 3/1982 | Giouinazzo et al. | 901/9 X |
| 4,602,848 | 7/1986 | Honds et al. | 350/247 |
| 4,874,998 | 10/1989 | Hollis, Jr. | 318/568 |
| 4,882,836 | 11/1989 | Higuchi . | |
| 4,921,396 | 5/1990 | Asakawa et al. | 318/568.11 |
| 4,977,790 | 12/1990 | Nishi et al. | 901/21 X |
| 4,991,309 | 2/1991 | Nagasawa et al. | 318/646 X |
| 5,023,423 | 6/1991 | Tsujii et al. | 219/108 |
| 5,023,533 | 6/1991 | Ishikawa et al. | 318/568.21 |
| 5,053,599 | 10/1991 | Tsujii et al. | 219/116 |

Primary Examiner—Paul Ip
Attorney, Agent, or Firm—Armstrong, Nikaido, Marmelstein, Kubovcik, and Murray

[57] ABSTRACT

A five degree-of-freedom positioning device includes a manipulator shaft for manipulating an object to a desired position and orientation. Two sets of stator permanent magnets are spaced along an axis of the manipulator and arranged in parallel planes transverse to the manipulator axis so as to provide therebetween magnetic fields substantially extending along the axis. Interposed between the sets of permanent magnets are axially spaced sets of electrically energizable coils also arranged in parallel transverse planes. The coils are energized to produce coil fields that interact with the magnetic fields of the permanent magnets for generating the Lorentz force which acts on the manipulator shaft to effect two translational movements of the manipulator shaft along two mutually orthogonal axes perpendicular to the manipulator shaft axis and three rotational movements about the three mutually orthogonal axes including the manipulator shaft axis. An electromagnet or electromagnetic actuator is additionally included to effect the translational movement of the manipulator shaft along its axis.

14 Claims, 11 Drawing Sheets

MULTIPLE DEGREE-OF-FREEDOM POSITIONING DEVICE

BACKGROUND OF THE INVENTION

1. Field of the Invention

The present invention is directed to a multiple degree-of-freedom positioning device, and more particularly to such a positioning device having a manipulator shaft for manipulating an object to a desired position and orientation with a suitable compliance, such as used in an automated assembly line for mounting and assembling directionally oriented parts like many electronic components, or used to effect fine positioning of a machine table.

2. Description of the Prior Art

There have been proposed such a multiple degree-of-freedom fine positioning device as seen in U.S. Pat. No. 4,874,998, for controlling to move an object in multiple degree-of-freedom with suitable compliance. The patent discloses a hexagonal movable unit and a stator support unit for magnetically levitating the movable unit. The stator unit has a correspondingly shaped dual periphery within which the hexagonal movable unit is nested and carries six pairs of permanent magnets spaced circumferentially about the dual periphery in correspondence to six coils formed around the hexagonal movable unit. Each of the coils are disposed within a magnetic gap formed between the permanent magnets in each pair such that coil fields developed by energization of the respective coils interact with the related magnetic field at the gap to generate translational forces and rotational forces along and about three mutually perpendicular axes. An end effector is carried on the movable unit for effecting an intended work. However, the device of this patent is relatively bulky particularly in the radial direction of the movable unit because of the dual periphery structure of the stator unit and because of the circumferentially spaced magnets arranged about that dual periphery.

Another prior art multiple degree-of-freedom fine positioning device is disclosed in U.S. Pat. No. 4,602,848 which comprises a permanent magnet sleeve as a movable part of the device and two sets of stator coils arranged at the axial ends of the sleeve, respectively in parallel transverse planes. The stator coils are electrically energized to co-act with the external return field of the magnet sleeve to produce a reaction force acting on the magnet sleeve to move it in three mutually perpendicular axes including an axis of the magnet sleeve and to rotate it about two of the three axes excluding the axis of the magnet sleeve. In this patent, the stator coils are arranged radially outwardly of the magnet sleeve to thereby increase the radial dimension of the device. Therefore, this patent also fails to provide a compact structure particularly to the radial direction about a major axis defined by a movable unit or the magnet sleeve of the device.

SUMMARY OR THE INVENTION

The above problem has been eliminated in the present invention which provides a uniquely configured multi degree-of-freedom fine positioning device. The positioning device in accordance with the present invention comprises a manipulator shaft which is adapted to manipulate an object at a desired position and orientation and defines an major axis of the device. Provided respectively at the axial ends of the manipulator shaft axis are two spaced sets of stator magnetic elements including at least one permanent magnet which are cooperative to produce magnetic field extending substantially axially along the manipulator shaft. The manipulator shaft carries two axially spaced sets of movable coils which lie substantially in parallel transverse planes between the sets of the stator permanent magnets. Each of the movable coils has its substantial portion interposed between the two axially spaced sets of the stator magnetic elements such that the coils produce individual coil fields which interact with the corresponding magnetic fields to develop Lorentz forces acting on the manipulator shaft for effecting two translational movement along two mutually orthogonal axes perpendicular to the major axis of the manipulator shaft and three rotational movements about the three mutually orthogonal axes. Consequently, the sets of the stator magnetic elements and the sets of the movable coils can be arranged axially along the major axis of the device in a superimposed fashion, which contributes to greatly reduce the radial dimension of the device about the major axis thereof.

Accordingly, it is a primary object of the present invention to provide a multiple degree-of-freedom fine positioning device which is capable of being made into a compact structure with reduced radial dimension about the major axis of the device.

Preferably, each set of the stator permanent magnets comprises four permanent magnets spaced circumferentially about the manipulator shaft substantially within a transverse plane in such a way that each one of the permanent magnets in one set is axially aligned with corresponding one of the permanent magnets in the other set to define four substantially separate magnetic fields spaced circumferentially about the manipulator shaft and extending substantially axially between the two sets of the permanent magnets. The permanent magnets are so magnetized to have the four magnetic fields of opposite directions in relation to the adjacent ones. Each set of the movable coils comprises four movable coils arranged circumferentially about the manipulator shaft substantially within a transverse plane. Each movable coil is shaped to have opposed portions flowing an energizing current in the opposite directions. The four movable coils in each set are disposed in such a manner that each coil has its opposed portions transversing the two adjacent magnetic fields of opposite directions, respectively so that the opposed portions of each coil can receives the Lorentz force of substantially the same direction. Thus, each magnetic fields can be utilized to interact with the two adjacent coils to efficiently drive the manipulator shaft, in addition to that the movable coils can be closely arranged in the plane with the portions being overlapped upon each other.

It is therefore another object of the present invention to provide a multiple degree-of-freedom positioning device which is capable of improving electromagnetic actuation efficiency of the manipulator shaft, as well as capable of arranging the movable coils in a closely adjacent relation to each other within a limited space to thereby assure more compact arrangement of the device.

A set of four magnetic pieces may be included in the device which are arranged in a transverse plane between the two sets of stator permanent magnets. Each magnetic piece is disposed in each of the four separate magnetic fields to define eight magnetic gaps between the four magnetic pieces and the two sets of four permanent magnets so that the two sets of four movable coils are disposed respectively in the eight magnetic gaps through which the magnetic fields extend substantially axially. The magnetic pieces which may be permanent magnet act to strengthen the magnetic fields interacting the coil fields to thereby increase magnetic efficiency thereof, which is therefore a further object of the present invention.

In a preferred embodiment, an electromagnet is added in the device which is positioned at the axial end of the manipulator shaft and fixed relative to the set of the stator permanent magnets. The electromagnet comprises excitation coil means and an armature connected to one end of the manipulator shaft such that the manipulator shaft is driven to move axially by selective energization of the excitation coil means. Thus, the electromagnet is responsible for adding a translational movement of the manipulator shaft along its major axis such that the device can have six degree-of-freedom movement. Due to the nature of the electromagnet, it is readily possible to obtain a relatively strong force as compared to the Lorentz forces. Therefore, the addition of the electromagnet is particularly advantageous when the manipulator is required to exert a relatively strong force for moving the object along the major axis such as for inserting the object part in a corresponding recess along the axis or to have an increased compliance.

It is therefore a still further object of the present invention to provide a multiple degree-of-freedom positioning device in which an electromagnet is additionally included to utilize an electromagnetic force to effect translational movement only along the major axis of the device, while the other translational movements along the other two orthogonal axes and three rotational movements about the three axes can be derived from the Lorentz forces.

Alternately, another linear DC actuator may be added instead of the electromagnet to exert a Lorentz force for effecting the translational movement of the manipulator shaft along its axis. Such linear DC actuator comprises permanent magnet means and a coil unit connected to the end of the manipulator shaft. The permanent magnet means is fixed relative to one set of the permanent magnets and produces a magnetic filed which is cooperative with the coil unit for generating such a Lorentz force that acts on the coil unit to move the manipulator shaft axially together with said coil unit independently of the magnetic fields produced by the sets of the movable coils. Also with this arrangement, it is readily possible to adjust or vary the strength of the Lorentz force applied for translational movement of the manipulator shaft along its axis independently from those applied for the other translational movements and rotational movements.

It is therefore a further object of the present invention to provide a multiple degree-of-freedom positioning device which is capable of separately adjusting the translational movement of the manipulator shaft along its axis independently of the other translational and rotational movements.

Instead of the electromagnet or the liner DC actuator, the device may include a mechanical spring connected to the manipulator shaft for providing a mechanical compliance in the axial direction thereof.

The device of the present invention includes sensor means sensing the position and orientation of said manipulator shaft and providing a sensor output indicative of the position and orientation of the manipulator shaft. The sensor output is fed to control means which controls the energization of the coils for effecting the translational and rotational movements of the manipulator shaft along and about said three mutually orthogonal axes to move it to a desired position or maintain it at a position with a suitable compliance.

These and still other objects and advantageous features of the present invention will become more apparent in the following description of the embodiments of the present invention when taking in conjunction with the attached drawings.

BRIEF DESCRIPTION OF THE DRAWINGS

FIG. 2 is a perspective view of an assembling robot to which the positioning device of the present invention is adapted for mounting parts to a housing or the like;

DETAILED DESCRIPTION OF THE EMBODIMENTS

Figure 1:
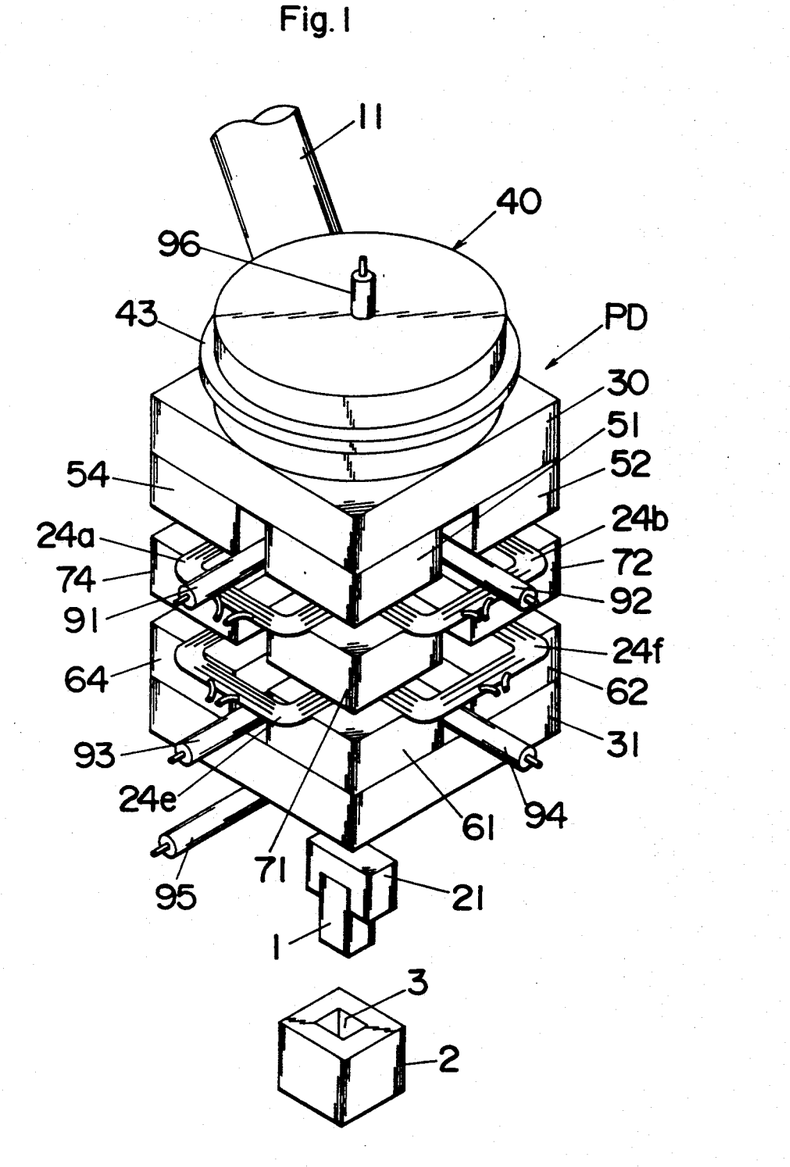
FIG. 1 is a perspective view in rather schematic representation of a multiple degree-of-freedom positioning device in accordance with a first embodiment of the present invention.

Referring now to FIG. 1, there is shown a multiple degree-of-freedom positioning device in accordance with a first embodiment of the present invention. The positioning device PD includes a manipulator shaft 20 which manipulates an object 1 such as an electronic part for inserting, mounting, and assembling into and onto a body. In the figure, the manipulator 20 is shown for an illustrative purpose to insert the part 1 into a socket 3 of the body 2. To achieve fine positioning of the object, the device is contemplated to move the manipulator shaft 20 in multiple degree-of-freedom. That is, the manipulator shaft 20 is driven to move along an axis of the manipulator shaft 20 and along two other axes perpendicular to the manipulator shaft axis, and to rotate about these three mutually perpendicular axes. In the description, the x-y-z coordinate system is utilized to denote the movement of the device in which the z-coordinate is defined by the manipulator shaft axis, and x- and y-coordinate lie in a transverse plane perpendicular to the z-coordinate axis. Therefore, the device is designed to generate three forces Fx, Fy and Fz along three coordinate axes (x,y,z) as well as three rotational forces or torques Tx, Ty and Tz for effecting three translational movements and three rotational movements of the manipulator shaft 20 along and about the three coordinate axes (x,y,z).

Figure 2:
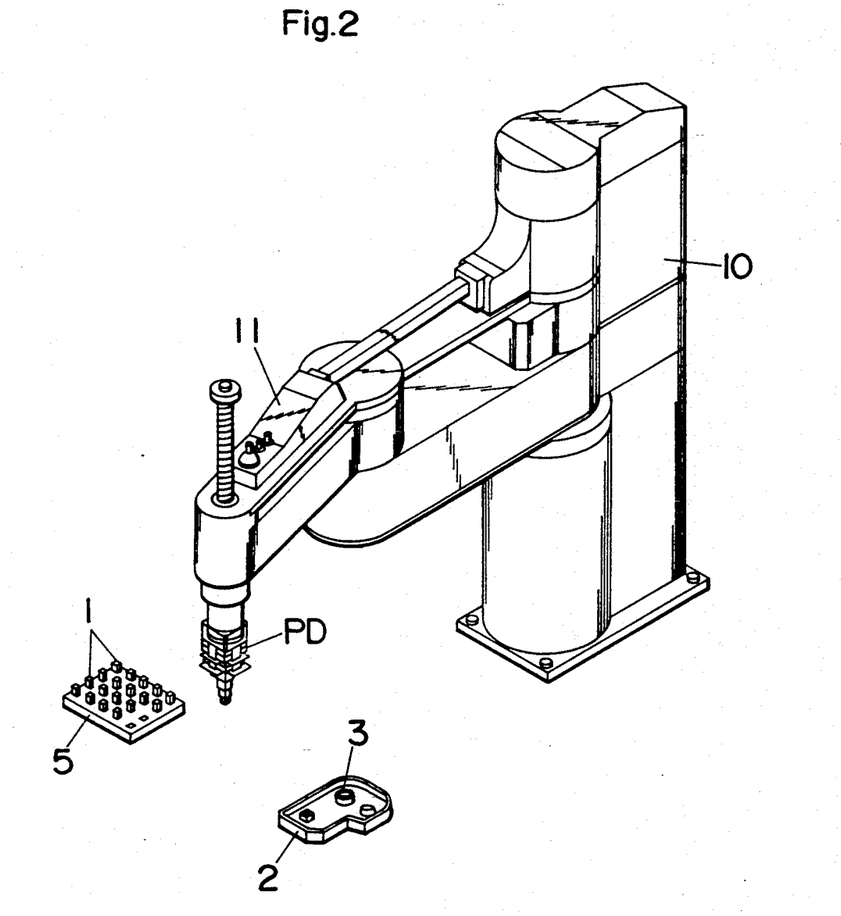

As shown in FIG. 2, the device PD is in use, for example, attached to the end of an operator arm 11 of an assembling robot 10 such that the operator arm 11 takes a coarse positioning while the device PD takes a fine positioning with a desired compliance. In the figure, the device PD is shown to take the object part 1 from a pallet 5 and then insert or assembly the object part 1 into the socket 3 of the target body or housing 2 in cooperation with the coarse positioning of the operator arm 11. To this end, the manipulator shaft 20 is provided at its lower end with a chuck 21 for gripping the object part 1 and is controlled to move in one or more degrees of freedom with a desired compliance.

Figure 3:
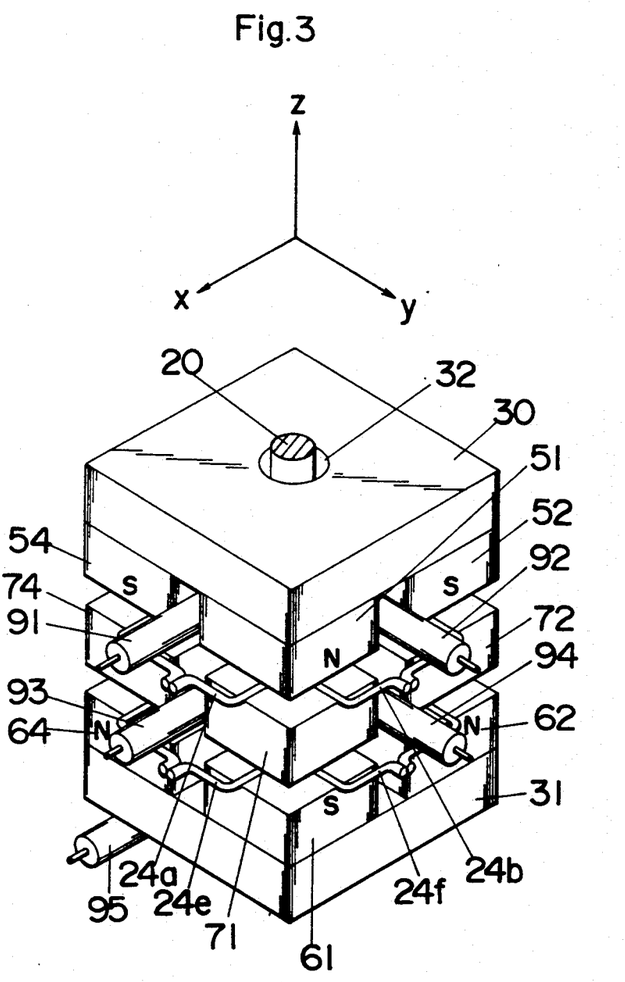
FIG. 3 is a perspective view in rather schematic representation of the positioning device with an electromagnet removed therefrom.
Figure 4:
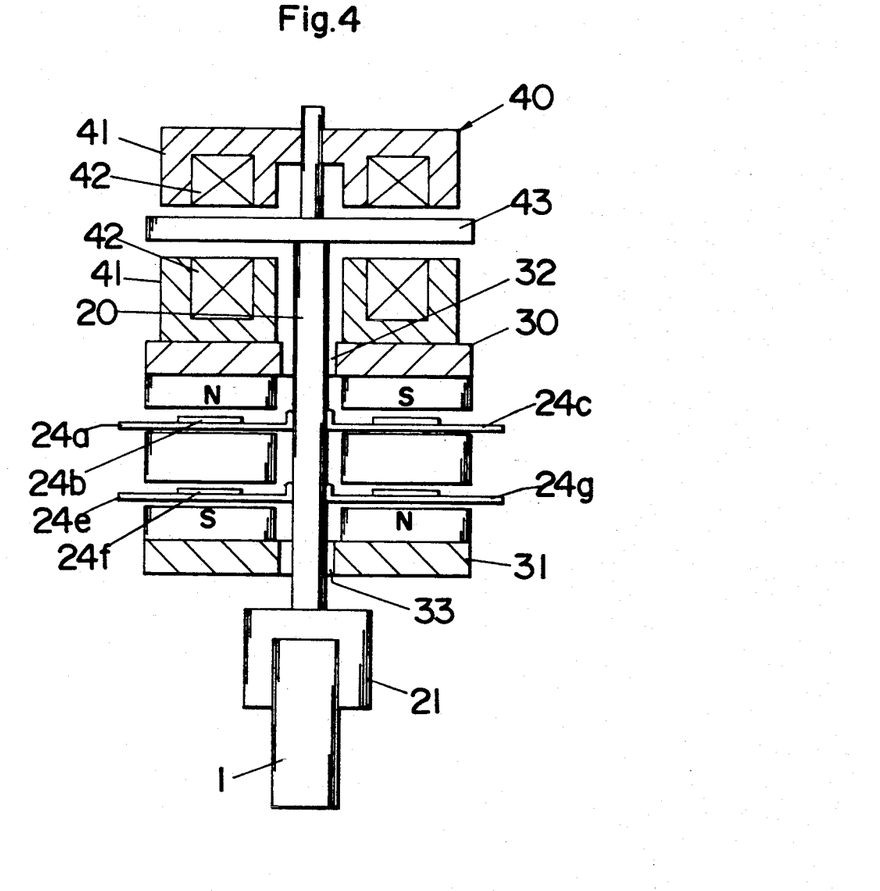
FIG. 4 is a vertical section in rather schematic representation of the positioning device.

The device PD comprises an axially spaced pair of base plates 30 and 31 of magnetic material which define a stator unit supported to the operator arm 11 of the robot 10. The base plate 30 and 31 are disposed in parallel transverse planes and formed with center openings 32 and 33, as shown in FIGS. 3 and 4, through which the manipulator shaft 20 extends loosely so that it is movable relative to the stator unit in all the degrees of freedom. Fixed on the upper base plate 30 is an electromagnet 40 which, as best shown in FIG. 4, comprises an axially spaced cores 41 with respective coil windings 42. A disc-shaped armature 43 connected to the upper end of the manipulator shaft 20 is disposed between the cores 41 to be magnetically attracted to upper and lower cores 41 upon selective energization of the coil windings 42, thereby generating a translational force Fz acting on the manipulator shaft 20 to move it along the z-coordinate axis direction or give a desired compliance in that direction.

Each of the base plates 30 and 31 is of square configuration and carries on its inner surface a set of four permanent magnets 51 to 54 and 61 to 64 at the four corner sections such that the four permanent magnets are spaced circumferentially evenly about the manipulator shaft axis or z-coordinate axis while leaving a free center portion within which the manipulator shaft 20 is permitted to move in the x-y plane. The permanent magnets 51 to 54 and 61 to 64 in each set are axially magnetized to opposite polarity with respect to the adjacent ones. The permanent magnets 51 to 54 in the upper set are axially aligned respectively with the permanent magnets 61 to 64 in the lower set in a magnetically opposed relation such that there are formed between the axially spaced sets of the permanent magnets four substantially separated magnetic fields which are of opposite direction with respect to the adjacent ones and extend substantially along the axis of the manipulator shaft 20. Interposed between the sets of the permanent magnets 51 to 54 and 61 to 64 are a set of four magnetic pieces 71 to 74 which are spaced circumferentially about the axis of the manipulator shaft 20 in a transverse plane. These magnetic pieces 71 to 74, which may be permanent magnets, are axially aligned to the permanent magnets in the upper and lower sets to be disposed midway respectively in the four separate magnetic fields, thereby defining a total of eight magnetic gaps, the four with the permanent magnets 51 to 51 in the upper set and the four with the permanent magnets 61 to 64 in the lower set. One set of the permanent magnets may be replaced by a corresponding set of magnetic elements provided that such magnetic elements are cooperative with the other set of the permanent magnets to produce the like axially extending magnetic fields. Further, each set of the permanent magnets may be assembled into a unitary structure having circumferentially spaced magnetic poles.

Figure 5:
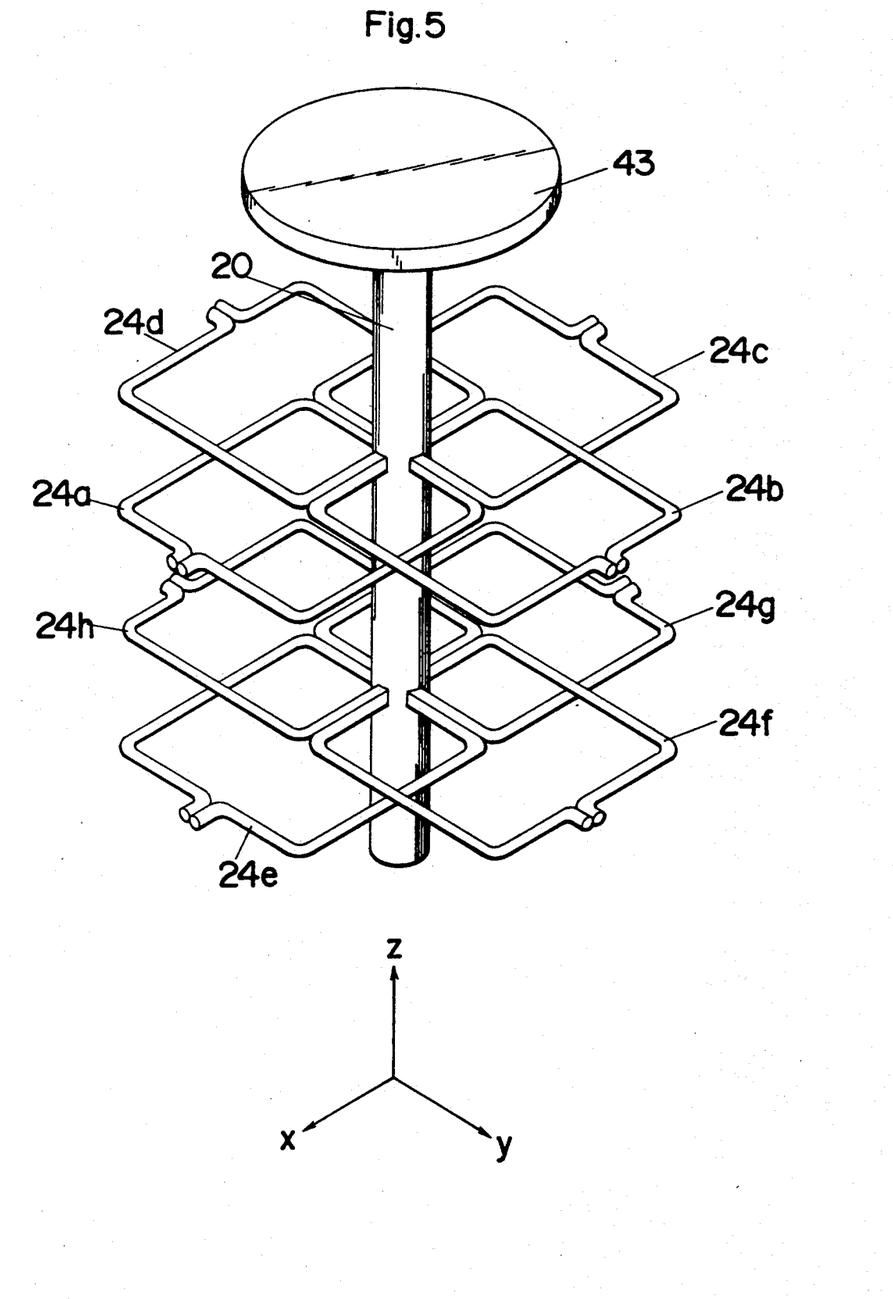
FIG. 5 is a perspective view of a manipulator shaft with two axially spaced sets of movable coils utilized in the positioning device.
Figure 6:
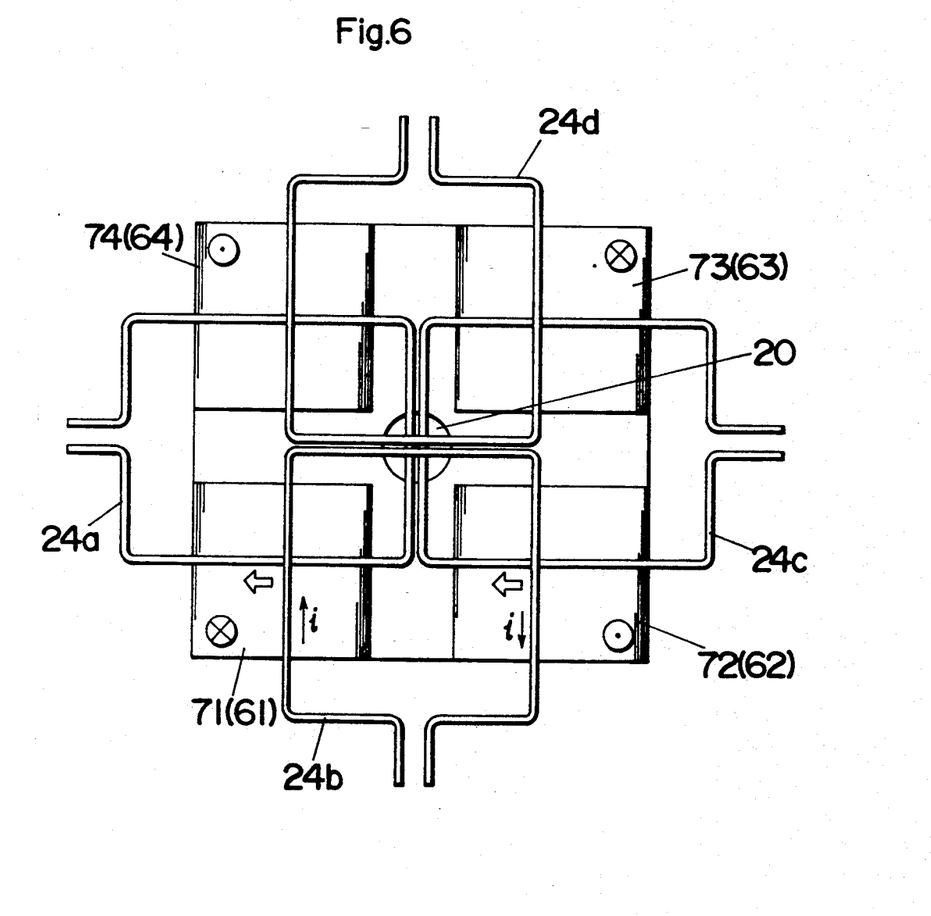
FIG. 6 is a schematic plan view illustrating a relationship between one set of the movable coils and a corresponding set of four permanent magnets of the device.

The manipulator shaft 20 is made of non-magnetic material and carries two sets of movable coils 24 each se composed of four movable coils which are separately energizable by electric currents. The manipulator shaft 20 and the movable coils 24a to 24h define a movable unit to be magnetically levitated with respect to the stator unit. The four movable coils 24a to 24d (24e to 24h) in each set are circumferentially arranged about the manipulator shaft 20 substantially within a plane transverse to the axis thereof, as shown in FIG. 5. Although the coils 24 are shown in a greatly schematic representation in the figure, they are each in the form of a flat air-core coil of generally square loop configuration having opposed parallel side segments and an end segment joining the side segments. The coils 24a to 24d (24e to 24h) in each set are angularly displaced by 90 degrees about the manipulator shaft 20 in such a manner that the diametrically opposed coils 24 have the respective end segments in a close parallel relation and each coil 24 has its opposed side segments in a crossing relation to the adjacent coils 24. Thus constructed movable unit is combined to the stator unit in such a way that the four coils 24a to 24d (24e to 24h) in each set have their substantial portions disposed between the set of the magnetic pieces 71 to 74 and the upper and lower sets of the permanent magnets 51 to 54 and 61 to 64, as shown in FIGS. 1, 3 and 4, and that each coil 24 has its opposed side segments transversing the two adjacent magnetic gaps, respectively, as best shown in FIG. 6. For example, when an energizing current i flows in the bottom coil 24b of FIG. in a counter-clockwise direction indicated by an arrow, the opposed side segments flow the current in the opposite directions. Since the opposed side segments of the coil 24b in the adjacent magnetic gaps intersect the corresponding magnetic fields of opposite polarity, the coil 24b will receive at the respective side segments Lorentz forces of the same direction as indicated by bold arrows. Therefore, by selectively energizing the coils 24 in a suitable pattern, the manipulator shaft 20 is magnetically driven to move along the x- and y-coordinate axes and to rotate about the x-, y-, and z-coordinate axes. In this sense, the manipulator shaft 20 can be said to have five degrees of freedom due to the Lorentz force actuation system. That is, the Lorentz forces developed by the interaction of the respective coil fields with the corresponding magnetic fields are summed to produce the translational forces Fx and Fy along the x- and y- coordinate axes and the torques Tx, Ty and Tz about the x-, y- and z-coordinate axes, whereby determining the position of the manipulator shaft 20 with a desired compliance in one or more of the five degrees of freedom. In detail, the translational movements and rotational movements are determined by the vector sum of the Lorentz forces developed at the selected coils in accordance with the following relations.

Translation along x coordinate axis:
The vector sum of the Lorentz forces developed at the individual coils 24b, 24d, 24f and 24h.

Translation along y coordinate axis:
The vector sum of the Lorentz forces developed at the individual coils 24a, 24c, 24e and 24g.

Rotation about x coordinate axis:
The vector sum of the Lorentz forces developed at axially spaced coils 24a, 24c and coils 24e and 24g.

Rotation about y coordinate axis:
The vector sum of the Lorentz forces developed at axially spaced coils 24b, 24d and coils 24f and 24h.

Rotation about z coordinate axis:
The vector sum of the Lorentz forces developed at coils 24a to 24h.

It is noted at this time that since the two sets of the permanent magnets 51 to 54 and 61 to 64 and the two sets of the movable coils 24 are superimposed in the axial direction of the manipulator shaft 20, the device can be made compact in the radial direction. Further, the above coil arrangement enables a close distribution of the coils about the manipulator shaft axis for further compacting the device and is cooperative with the four substantially separated magnetic fields to obtain increased magnetic efficiency for positioning the manipulator shaft 20 in the five degrees of freedom.

Figure 7:
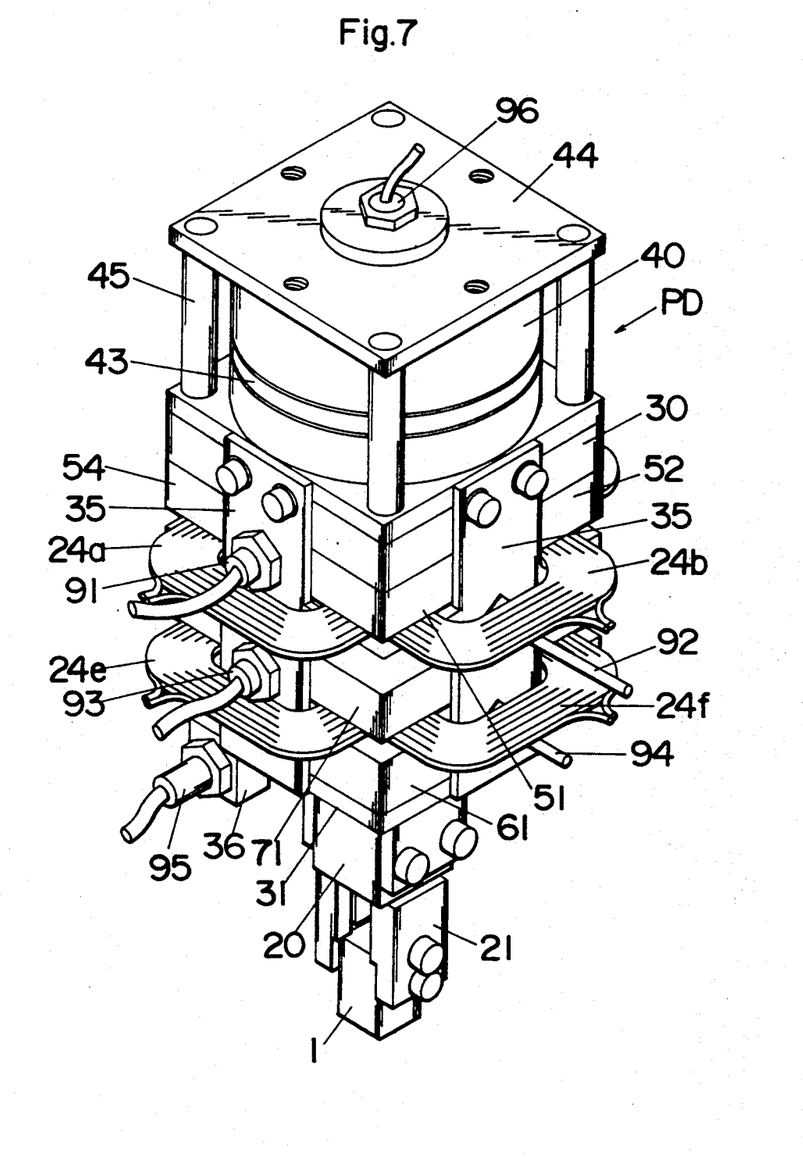
FIG. 7 is a perspective view in more detailed representation of the positioning device.
Figure 8:
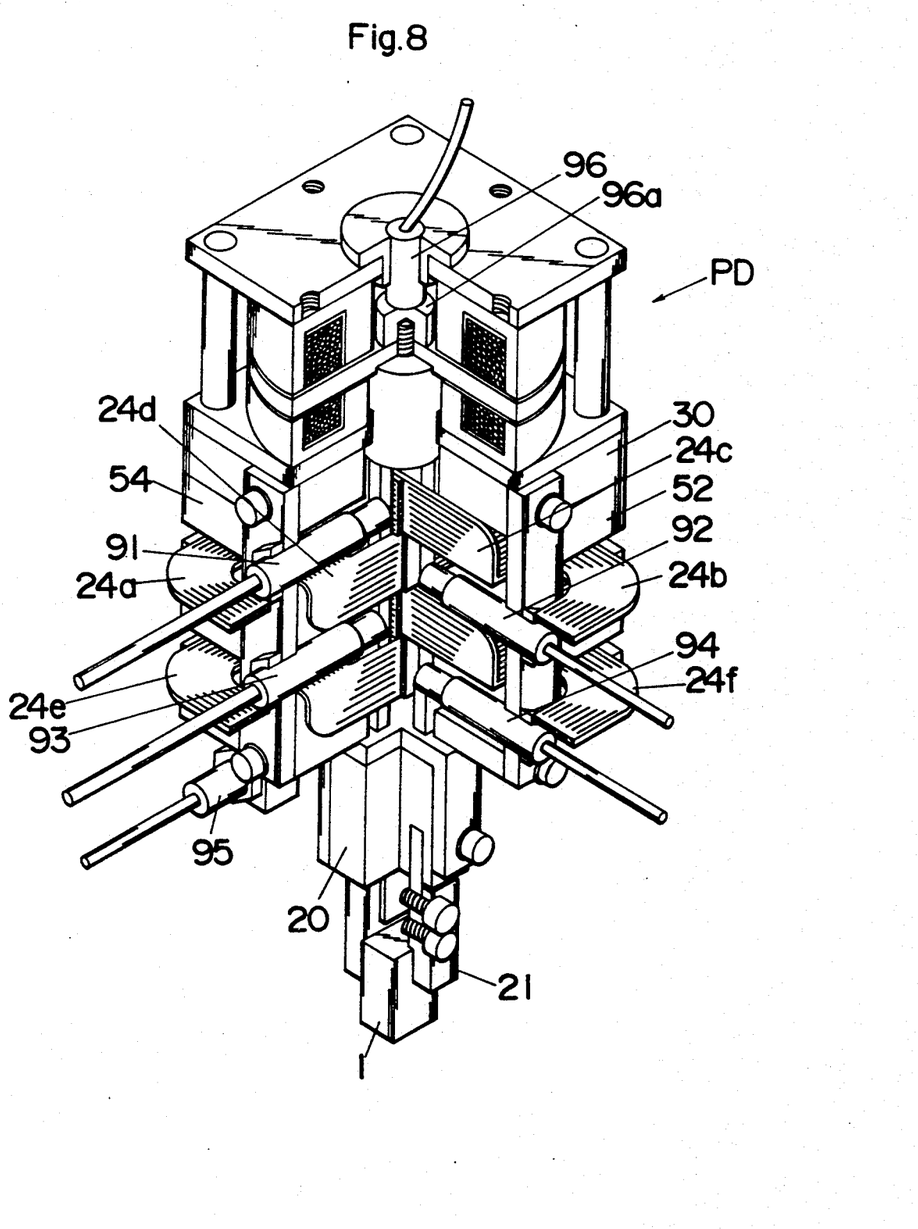
FIG. 8 is a perspective view in more detailed representation of the positioning device with a portion being cut away.
Figure 9:
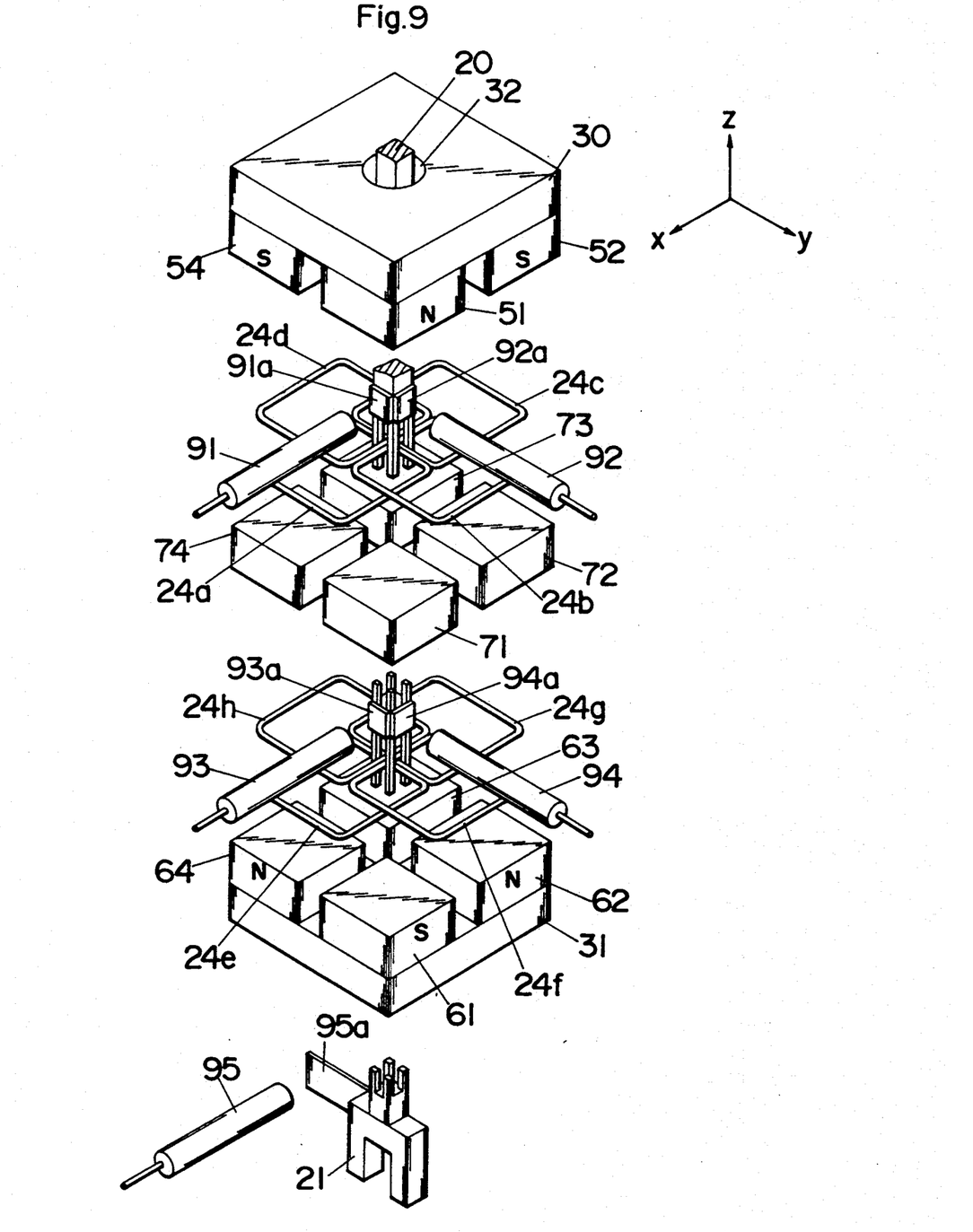
FIG. 9 is an exploded perspective view of the positioning device with the movable coils and other parts shown in greatly simplified way.

Although not shown in the figures, the device include a controller which controls the energization of the individual coils 24a to 24h in a feedback manner to determine the above two translational movements along the x- and y-coordinate axes and three rotational movements about x-, y- and z-coordinate axes. To this end, sensors 91 to 95 are included to provide outputs indicative of the position and orientation of the manipulator shaft 20. These sensors comprise two sensors 91 and 92 in the upper set, two sensors 93 and 94 in the lower set, and one bottom sensor 95, which are axially spaced, as shown in FIGS. 1, 3, 8 and 9. Each sensor is an optical distance sensor or the like fixedly mounted to the stator unit with its sensor end directed to a corresponding mirror 91A to 95A fixed to the manipulator shaft 20, as shown in FIG. 9, to measure the distance therebetween. The mirror 95A for the bottom sensor 95 is shown to be mounted on the chuck 21 coupled to the end of the manipulator shaft 20. The sensors 91 to 94 are mounted to the base plates 30 and 31 by means of brackets 35 which hold the permanent magnets 51 to 54, 61 to 64 as well as the magnetic pieces 71 to 74 in place with respect to the base plates 30 and 31, as shown in FIGS. 7 and 8. The bottom sensor 94 is likewise mounted to the lower base plate 31 by means of an additional bracket 36. The measured distances at the individual sensors are combined to provide an output indicative of the position and orientation of the manipulator shaft 20 in the five degrees of freedom with respect to the stator unit. Although the sensors 91 and 92 in the upper set and those 93 and 94 are shown, in FIGS. 1, 3 and 9, to lie in the same transverse planes respectively for schematic illustration purpose, they are actually staggered in the axial direction, as shown in FIG. 8, due to the structural limitation with regard to the physical connection of the movable coils 24a to 24h to the manipulator shaft 20, which will be discussed in detail hereinafter. The sensor output is fed to the controller for controlling the energizing current to the individual movable coils 24a to 24h to move the manipulator shaft 20 to a desired position or retain it a suitable position with a desired compliance in at least one of five degrees of freedom. Additional sensor 96 is provided at the upper end of the device to extend vertical through the upper core 41 of the electromagnet 40 with its sensor end directed to a corresponding mirror 96a on top of the armature 43 to sense the displacement of the manipulator shaft 20 in the z-coordinate axis direction. The sensor 96 is mounted in the center of a top plate 44 fixed to the upper base plate 30 by mean of posts 45 with the electromagnet 40 held therebetween, as shown in FIGS. 7 and 8. The output of the sensor 96 is also fed to the controller so that the controller can respond to energize the electromagnet 40 for controlling the translational movement of the manipulator shaft 20 in its axial direction in combination with the above control in the five degrees of freedom. In this sense, the device as a whole can be said to have six degrees of freedom, one from the magnetically attraction force at the electromagnet 40, and the other five from the Lorentz forces at the movable coils 24a to 24h. It should be noted in this connection that since the manipulator shaft 20 is driven to move along its axial direction by the electromagnet 40, it is readily possible to increase the attraction force of the electromagnet 40 for increased translational force of the manipulator shaft 20 along its axis independently of the other forces and torques. This is particularly advantageous when the manipulator shaft 20 is utilized to have its axis in coincident with direction of inserting the object part where an increased translational force is essential for inserting the object part along the axis. Further, with the use of the electromagnet 40 for the translational movement of the manipulator shaft 20, the translational force in that direction can be increased with an increase in the horizontal dimension of the armature 43 without adding an extra axial dimension of the electromagnet 40, contributing to maintain the axial length of the whole device at a minimum.

Figure 10:
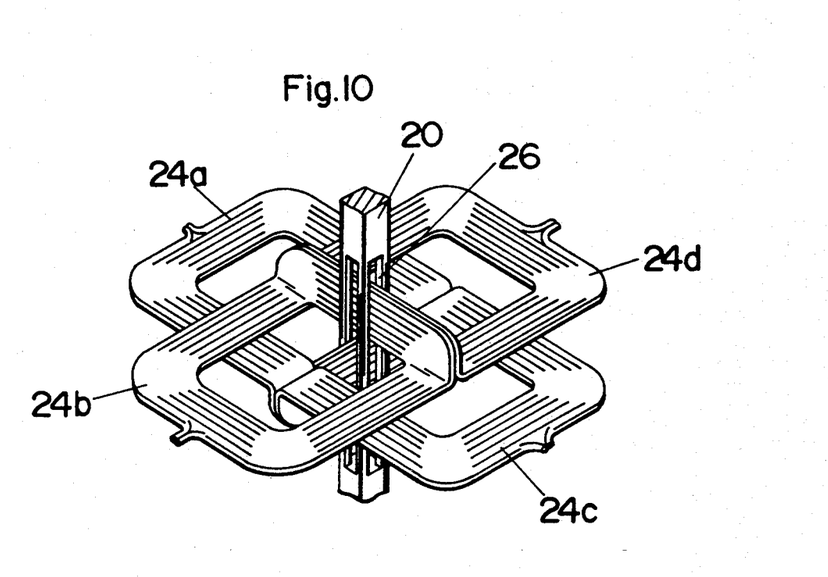
FIGS. 10 and 11 are respectively perspective and plan views illustrating the connection of the four movable coils to the manipulator shaft of the positioning device.
Figure 11:
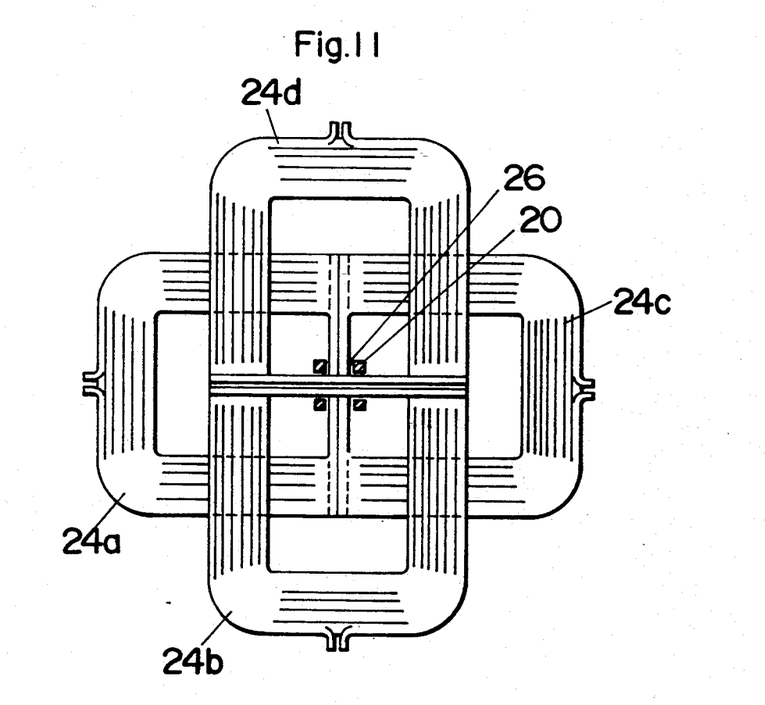

As shown in FIGS. 7, 8 and 10, each of the movable coils 24a to 24h is a flat air-core coil with a number of turns arranged in a horizontal plane. The end segment of each coil 24 is bent at a right angle and is inserted into a slit 26 extending axially in the manipulator shaft 20 for physical connection thereto, as shown in FIG. 10, such that two opposed coils 24 have their end segments bent upwardly in an abutting relation and the other two opposed coils 24 have their end segments bent downwardly in the like abutting relation. The slit 26 is in the form of a cross in the cross section, as shown in FIG. 11, so that the end segments bent in the sam direction are fitted in the slit 26 as being axially offset from those end segments bent in the opposite direction. Whereby, the remaining planar portions of the four coils in one set can be closely stacked to be arranged in substantially the transverse plane.

Figures 12, 13, 14, 15:
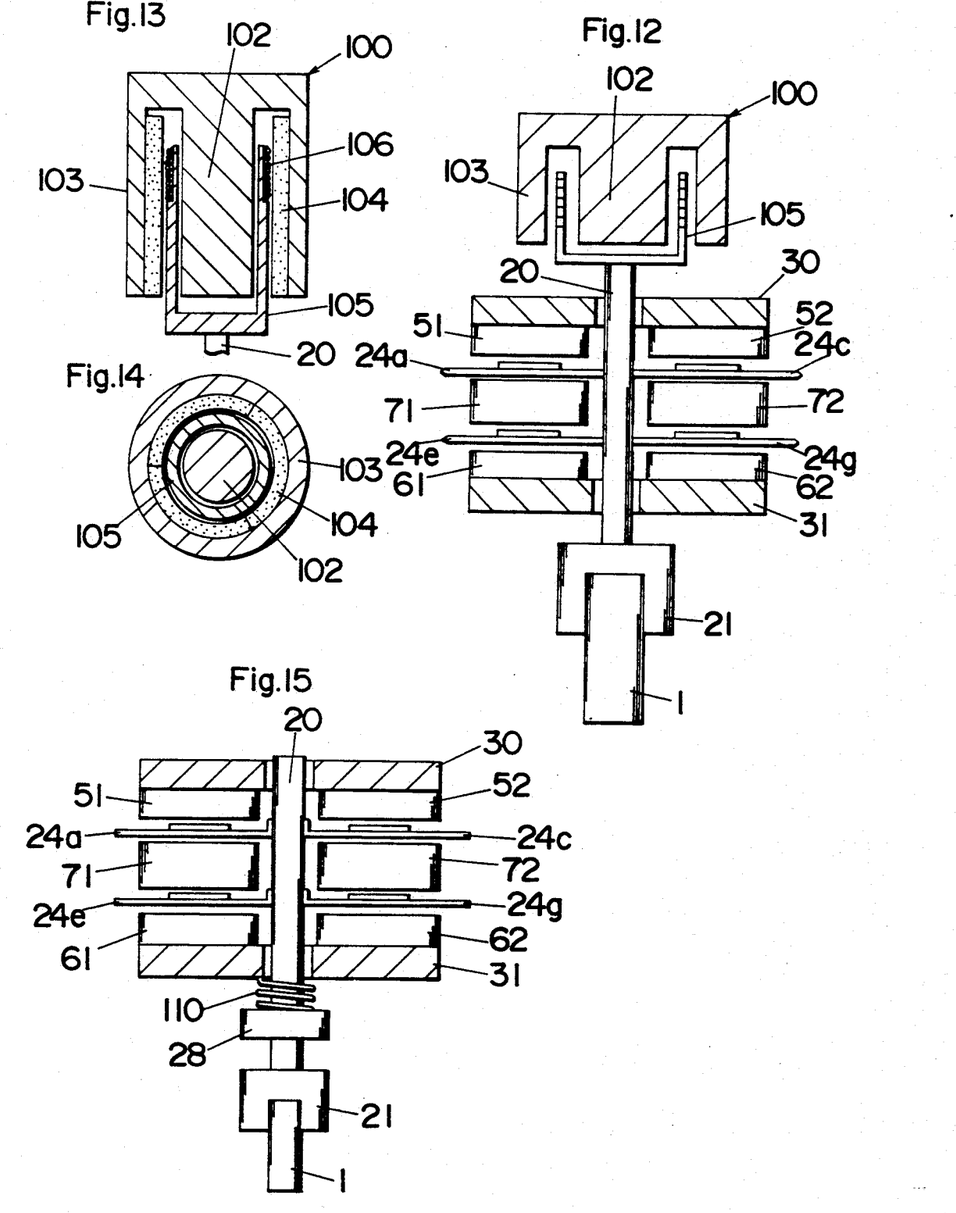
FIG. 12 is a vertical section in rather schematic representation of a positioning device provided with a linear DC actuator in accordance with a second embodiment of the present invention.
FIGS. 13 and 14 are respectively vertical and horizontal sections of the linear DC actuator of FIG. 12.
FIG. 15 is vertical sectional view in rather schematic representation of a positioning device provided with a mechanical spring in accordance with a third embodiment of the present invention.

FIGS. 12 to 14 illustrate a positioning device in accordance with a second embodiment of the present invention which is identical to the first embodiment except that a linear DC actuator 100 is provided instead of the electromagnet 40 for translational movement of the manipulator shaft 20. Therefore, like parts are designated by like numerals in the figures. The actuator 100 comprises a core of a generally E-shaped vertical section with a center core 102 and a peripheral yoke 103 spaced radially therefrom. A permanent magnet 104 in the form of a sleeve is fitted on the inner surface of the peripheral yoke 103 to form a loop-shaped air gap between the magnet sleeve 104 and the center core 102. The magnet sleeve 103 is magnetized in the radial direction to produce a radial magnetic field around the center core 102. Interposed between the radial gap is a coil barrel 105 with a winding 106 extending circumferentially about the center core 102 such that the winding 106 produces a coil field which interact with the magnetic field in the gap to develop a Lorentz force that acts upon the coil barrel 105 to move it vertically. The coil barrel 105 is coupled to upper end of the manipulator shaft 20 to effect the translational movement thereof along its axis or z-coordinate axis in response to the energization of the winding 106. The winding 106 is energized in association with the movable coils 24 by the like controller to effect the movements of the manipulator shaft 20 with a desired compliance in six degrees of freedom especially including the compliance in the z-coordinate direction with improved controllability.

FIG. 15 illustrates a positioning device in accordance with a third embodiment of the present invention which is identical to the first embodiment except that a mechanical spring 110 is provided in place of the electromagnet for providing a suitable compliance in the direction of the manipulator shaft 20 with no positive translational movement therealong. In the figure, like parts are designated by like numerals as in the first embodiment. The positive translational movement of the manipulator shaft 20 is effected by the operator arm 11 to which the device is attached, as shown in FIG. 2. Therefore, the device of this embodiment is a five degree-of-freedom positioning device. The mechanical spring 110, which is a compression spring, is disposed around the lower end of the manipulator shaft 20 between the lower base plate 31 and a flange 28 fixed upwardly of the chuck 21 to provide a desired compliance independently of the other compliances which may be effected in one or more of the five degrees of freedom. Thus, by selecting the mechanical spring of a desired spring constant, it is readily possible to adjust the compliance in the z-coordinate axis direction independently of the other movements and compliances for a specific task of the manipulator shaft 20, for example, inserting an object part into a target housing along the z-coordinate axis.

What is claimed is:

1. A five degree-of-freedom positioning device comprising:

a manipulator shaft adapted to manipulate an object to a desired position, said manipulator shaft defining an axis of said device;

two axially spaced sets of stator magnetic elements including at least one permanent magnet, said two axially spaced sets of stator magnetic elements being cooperative to produce substantially separate magnetic fields extending along the axial direction between said sets of the stator magnetic elements;

two axially spaced sets of electrically energized movable coils carried on said manipulator shaft and lying substantially in parallel transverse planes between said sets of the stator magnetic elements;

each of said movable coils having the substantial portion interposed between said two axially spaced sets of the stator magnetic elements such that said coils produce individual coil fields which interact with the corresponding magnetic fields to develop Lorentz forces acting on said manipulator shaft for effecting two translational movement along two mutually orthogonal axes perpendicular to the axis of said manipulator shaft and three rotational movements about the three mutually orthogonal axes.

2. A five degree-of-freedom positioning device comprising:

a manipulator shaft adapted to manipulate an object to a desired position, said manipulator shaft defining an axis of said device;

two axially spaced sets of stator permanent magnets which are cooperative to produce substantially separate magnetic fields extending along the axial direction between said sets of the stator permanent magnets;

two axially spaced sets of electrically energized movable coils carried on said manipulator shaft and lying substantially in parallel transverse planes between said sets of the stator permanent magnets;

each of said movable coils having the substantial portion interposed between said two axially spaced sets of the stator magnets such that said coils produce individual coil fields which interact with the corresponding magnetic fields to develop Lorentz forces acting on said manipulator shaft for effecting two translational movement along two mutually orthogonal axes perpendicular to the axis of said manipulator shaft and three rotational movements about the three mutually orthogonal axes.

3. A positioning device as set forth in claim 2, wherein each set of said stator permanent magnets comprises four permanent magnets spaced circumferentially about said manipulator shaft axis substantially within a transverse plane such that each one of said permanent magnets in one set is axially aligned with corresponding one of said permanent magnets in the other set to define four substantially separated magnetic fields spaced circumferentially about said axis and extending substantially axially between said sets of the permanent magnets, said four magnetic fields being of opposite direction in relation to the adjacent ones;

each of said sets of movable coils comprising four movable coils arranged circumferentially about said axis substantially within a transverse plane, each movable coil having opposed portions flowing an energizing current in the opposite directions, and the four said movable coils in each set arranged such that each coil has opposed portions transversing two said adjacent magnetic fields of opposite directions, respectively so that said opposed portions of each coil can receives the Lorentz force of substantially the same direction.

4. A positioning device as set forth in claim 3, wherein each said movable coil is a generally square configuration having parallel side segments which define said opposed portions flowing the energizing current in the opposite directions.

5. A positioning device as set forth in claim 4, wherein said movable coil has a generally straight end segment bridging said opposed side segments, said four movable coils in each set being connected to said manipulator shaft at respective centers of said end segment with said end segments of the diametrically opposed movable coils held close to each other.

6. A positioning device as set forth in claim 4 or 5, wherein said movable coil is a flat air-core coil having a flattened end segment and said manipulator shaft has an axially elongated cross-shaped slit in cross section, one pair of the diametrically opposed movable coils having their flattened end segments bent axially upwardly in an abutting relation and extending together into said slit, and the other pair of diametrically opposed movable coils having their flattened end segments bent axially downwardly in an abutting relation to each other and extending together into said slit.

7. A positioning device as set forth in claim 3, further including a set of four magnetic pieces arranged in a transverse plane between said sets of stator permanent magnets with each of said magnetic pieces disposed in each of said separate magnetic fields, said sets of movable coils being arranged between said set of magnetic pieces and the sets of the stator permanent magnets, respectively.

8. A positioning device as set forth in claim 7, wherein said magnetic pieces are permanent magnets.

9. A positioning device as set forth in claim 3, including a pair of axially spaced base plates of magnetic material on which said sets of permanent magnets are supported, respectively.

10. A positioning device as set forth in claim 9, wherein said base plate is of a square horizontal configuration carrying the four permanent magnets at four corner sections, respectively in such a manner as to leave a free center portion within which said manipulator shaft is permitted to move.

11. A positioning device as set forth in claim 3, further including an electromagnet positioned at the axial end of said manipulator shaft, said electromagnet comprising excitation coil means fixed relative to one of said sets of the stator permanent magnets and an armature connected to one end of said manipulator shaft such that said manipulator shaft is driven to move axially by selective energization of said excitation coil means.

12. A positioning device as set forth in claim 3, further including a linear DC actuator comprising permanent magnet means and a coil unit connected to the end of said manipulator shaft, said permanent magnet means fixed relative to one of said sets of permanent magnets and producing a magnetic filed which is cooperative with said coil unit for generating such the Lorentz force that acts on said coil unit to move the manipulator shaft axially together with said coil unit independently of said magnetic fields produced by said sets of the movable coils.

13. A positioning device as set forth in claim 3, further including a mechanical spring connected to said manipulator shaft for providing a mechanical compliance in the axial direction thereof.

14. A six degree-of-freedom positioning device comprising:

a manipulator shaft adapted to manipulate an object to a desired position, said manipulator shaft defining an axis of said device;

first actuator means comprising permanent magnet means and electrically energized coil means which are cooperative to generate a Lorentz force which acts on said manipulator shaft for effecting two translational movements along two mutually orthogonal axes perpendicular to the axis of said manipulator shaft and three rotational movements about the three mutually orthogonal axes;

second actuator means comprising an electromagnet with second coil means and an armature connected to said manipulator shaft, said electromagnet responding to energization of said second coil means to generate a magnetic attraction/repulsion force which acts on said manipulator shaft for effecting one translational movement of said manipulator shaft along the axis thereof;

sensor means sensing the position and orientation of said manipulator shaft and providing a sensor output indicative of the position and orientation of the manipulator shaft; and control means connected to control said first and second actuator means in response to said sensor output for effecting the translational and rotational movements of said manipulator shaft along and about said three mutually orthogonal axes.

* * * * *